United States Patent
Park (10) Patent No.: US 9,059,462 B2
(45) Date of Patent: *Jun. 16, 2015

(54) CATHODE AND LITHIUM BATTERY USING SAME

(75) Inventor: Kyu-Sung Park, Suwon-si (KR)

(73) Assignee: SAMSUNG SDI CO., LTD., Suwon-si, Gyeonggi-do (KR)

(*) Notice: Subject to any disclaimer, the term of this patent is extended or adjusted under 35 U.S.C. 154(b) by 1223 days.

This patent is subject to a terminal disclaimer.

(21) Appl. No.: 12/631,198

(22) Filed: Dec. 4, 2009

(65) Prior Publication Data

US 2010/0143803 A1 Jun. 10, 2010

(30) Foreign Application Priority Data

Dec. 5, 2008 (KR) .................. 10-2008-0123153

(51) Int. Cl.
| | |
|---|---|
| *H01M 4/13* | (2010.01) |
| *H01M 4/485* | (2010.01) |
| *H01M 4/131* | (2010.01) |
| *H01M 4/1391* | (2010.01) |
| *H01M 4/62* | (2006.01) |
| *H01M 4/64* | (2006.01) |

(52) U.S. Cl.
CPC .............. *H01M 4/485* (2013.01); *H01M 4/131* (2013.01); *H01M 4/1391* (2013.01); *H01M 4/621* (2013.01); *H01M 4/64* (2013.01); *H01M 4/625* (2013.01); *Y02E 60/122* (2013.01)

(58) Field of Classification Search
CPC ..... H01M 4/131; H01M 4/621; H01M 4/625; H01M 4/64; H01M 4/0471; H01M 4/049; H01M 4/1391; H01M 2004/02; H01M 2004/028; H01M 4/485; Y02E 60/122
USPC ........ 429/231.5, 231.1, 231.6, 231.9, 231.95, 429/232; 252/182.1, 508, 509
See application file for complete search history.

(56) References Cited

U.S. PATENT DOCUMENTS

| | | | |
|---|---|---|---|
| 6,346,348 B1 * | 2/2002 | Nakajima et al. .......... | 429/231.5 |
| 6,391,496 B1 | 5/2002 | Nakajima et al. | |
| 6,908,710 B2 | 6/2005 | Barker et al. | |
| 6,949,233 B2 | 9/2005 | Kweon et al. | |
| 6,991,874 B1 | 1/2006 | Möhwald et al. | |
| 7,364,793 B2 | 4/2008 | Paulsen et al. | |

(Continued)

FOREIGN PATENT DOCUMENTS

| | | |
|---|---|---|
| CA | 2222494 A1 * | 5/1999 |
| JP | 2000-277113 | 10/2000 |

(Continued)

OTHER PUBLICATIONS

Japanese Office Action dated Feb. 21, 2012.

*Primary Examiner* — Laura Weiner
(74) *Attorney, Agent, or Firm* — Lee & Morse, P.C.

(57) ABSTRACT

A cathode and a lithium battery including the cathode include a cathode active material that is obtained from a compound, $Li_2MoO_3$, in which molybdenum is doped or partially substituted with a heterogeneous element. The cathode active material includes a compound represented by $Li_xM_yMo_zO_3$, in which M is a dopant that decreases the mobility of the molybdenum upon charging and discharging of the battery. Accordingly, the cathode has improved electrical characteristics.

18 Claims, 4 Drawing Sheets

(56) References Cited

U.S. PATENT DOCUMENTS

| | | |
|---|---|---|
| 2005/0265909 A1 | 12/2005 | Kajiya et al. |
| 2006/0194119 A1 | 8/2006 | Son et al. |
| 2009/0098278 A1 | 4/2009 | Suh et al. |

FOREIGN PATENT DOCUMENTS

| | | |
|---|---|---|
| JP | 2004-055472 | 2/2004 |
| JP | 2005-079077 | 3/2005 |
| JP | 3904392 | 1/2007 |
| KR | 2002-0092736 | 12/2002 |
| KR | 10-406816 | 11/2003 |
| KR | 10-437340 | 6/2004 |
| KR | 2006-28121 | 3/2006 |
| KR | 10-627271 | 9/2006 |
| KR | 10-752037 | 8/2007 |
| WO | WO 2006/091020 | 8/2006 |

* cited by examiner

CATHODE AND LITHIUM BATTERY USING SAME

CROSS-REFERENCE TO RELATED APPLICATION

This application claims the benefit of Korean Patent Application No. 10-2008-0123153, filed Dec. 5, 2008, in the Korean Intellectual Property Office, the disclosure of which is incorporated herein by reference.

BACKGROUND OF THE INVENTION

1. Field of the Invention

One or more embodiments relate to a cathode and a lithium battery including the same, and more particularly, to a cathode with improved electrical characteristics and a lithium battery including the same.

2. Description of the Related Art

In general, examples of a cathode active material that is used in a lithium battery include $LiNiO_2$; $LiCoO_2$; $LiMn_2O_4$; $LiFePO_4$; $LiNi_xCo_{1-x}O_2$, where $0<x<1$; and $LiNi_{1-x-y}Co_xM-n_yO_2$, where $0\leq x\leq 0.5$ and $0\leq y\leq 0.5$.

However, there is a need to improve the high-rate properties and capacities of these cathode active materials to produce lithium batteries having a high capacity. Lithium batteries having a high capacity are required as mobile electronic devices become more complex and perform more functions. Such lithium batteries can be made by changing a battery system design, developing manufacturing techniques, and improving battery forming materials.

Meanwhile, $Li_2MoO_3$ is getting more attention as an active material because Co, which is expensive and toxic, is not used. However, lithium deintercalation is suppressed due to interlayer movement of $Mo^{6+}$ ions, which are generated during charging.

SUMMARY OF THE INVENTION

One or more embodiments include a cathode including a cathode active material with improved electrical characteristics. One or more embodiments include a lithium battery including the cathode.

Additional aspects will be set forth in part in the description which follows and, in part, will be apparent from the description, or may be learned by practice of the invention.

According to aspects of the invention, one or more embodiments may include a cathode in which a cathode active material composition including a conducting agent, a binder, and a cathode active material is disposed on a surface of a collector, wherein the cathode active material comprises a compound represented by Formula 1 below:

$$Li_xM_yMo_zO_3 \qquad \text{<Formula 1>}$$

wherein $0.1\leq x\leq 2.3$, $0<y\leq 0.3$, and $0.7\leq z\leq 1.1$.

According to aspects of the invention, M may be one selected from the group consisting of Al, Ga, Ge, Mg, Zn, Cd, K, Na, Ca, Si, Cu, Sn, B, P, Se, Bi, As, Zr, Cr, Sr, Sc, Y, Ba, a rare-earth element, and mixtures thereof.

According to aspects of the invention, M may be at least one selected from the group consisting of Ga, Ge, Mg, and Zn.

According to aspects of the invention, M may be Al.

According to aspects of the invention, M may include a combination of Al and Zn or a combination of Zn and Mg.

According to aspects of the invention, one or more embodiments may include a lithium battery including: a cathode as described above; an anode; a separator disposed between the anode and the cathode; and an organic electrolyte solution disposed in the lithium battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A cathode according to an embodiment includes a compound represented by Formula 1 as an active material:

$$Li_xM_yMo_zO_3, \qquad \text{<Formula 1>}$$

where $0.1\leq x\leq 2.3$, $0<y\leq 0.3$, and $0.7\leq z\leq 1.1$, and M is at least one element selected from Al, Ga, Ge, Mg, Zn, Cd, K, Na, Ca, Si, Cu, Sn, B, P, Se, Bi, As, Zr, Cr, Sr, Sc, Y, Ba, a rare-earth element, and mixtures thereof.

The cathode active material represented by Formula 1 in which Mo of the conventional active material is substituted with other elements to prevent interlayer movement of Mo during charging or discharging of the active material, and accordingly, more lithium is intercalated and deintercalated, and electrical characteristics, such as the capacity of the lithium battery using the cathode, can be improved.

M is a doping element or dopant for substitution of the Mo in Formula 1. Examples of M include Al, Ga, Ge, Mg, Zn, Cd, K, Na, Ca, Si, Cu, Sn, B, P, Se, Bi, As, Zr, Mn, Cr, Sr, Sc, Y, Ba, a rare-earth element, and mixtures thereof. M may be one selected from the group consisting of Ga, Ge, Mg, and Zn, and mixtures thereof; for example, M may be a combination of Zn and Mg. M may be, for example, a combination of Al and Zn.

The cathode active material represented by Formula 1 as described above may have a single layer structure, and may have a mean particle diameter of about 0.1 μm to about 10 μm, for example, about 0.2 μm to about 3 μm.

The cathode active material of Formula 1 may further include carbon, and the amount of carbon may be about 0.1 wt % to about 5 wt % with respect to the weight of all of the cathode active material.

x, y, and z represent relative ranges of the molar ratio of each of the components in the cathode active material of Formula 1. x is from about 0.1 to about 2.3; y is about 0.3 or smaller, for example, about 0.01 to about 0.15; and z is about 0.7 to about 1.1, for example, about 0.8 to about 1.05. The cathode active material according to Formula 1 can have compositions in the above ranges.

The cathode active material of Formula 1 as described above can be prepared using various processes, such as a solid-state reaction method, a sol-gel method, a calcination method, or a co-precipitation method, but aspects are not limited thereto.

In the solid-state reaction method, a powder lithium source and a molybdenum source are mixed at a predetermined molar ratio as reactant materials and are heat treated (i.e., a first heat treatment) to prepare $Li_2MoO_4$. The prepared $Li_2MoO_4$ may be mixed with a doping element, that is, a source of M, in the presence of a predetermined amount of carbon, and may be heat treated again (i.e., a second heat treatment) to prepare the cathode active material represented by Formula 1.

Examples of the lithium source used in the above preparation method include, but are not limited to, powder carbon lithium, nitric acid lithium, and lithium oxide. Examples of the molybdenum source include, but are not limited to, powder molybdenum oxide, nitric acid molybdenum, and carbon molybdenum. Examples of sources for the doping element represented by M include carbonates, nitrates, and oxides including M.

The lithium source and the molybdenum source mixed before the first heat treatment may be mixed in sufficient amounts for preparing $Li_2MoO_4$; for example, lithium may be used in an amount of about 1.0 to about 1.1 mol per mol of molybdenum.

Carbon used in the second heat treatment reacts with the oxygen (O) of $Li_2MoO_4$, which is an intermediate, to produce CO and $CO_2$, wherein the amount of carbon may be about 1.0 mol per mol of $Li_2MoO_4$. Also, the molar ratio of M, the doping element, may be used in a sufficient amount for producing the cathode active material of Formula 1. For example, the molar ratio of M may be greater than 0 mol and about 0.3 mol or less with respect to about 0.7 mol to about 1.1 mol of molybdenum.

The first heat treatment may be performed in the atmosphere or under an oxidization atmosphere, and at about 400° C. to about 650° C. for about 0.5 hour to about 24 hours.

The second heat treatment may be performed under a reduction atmosphere, such as a nitrogen atmosphere or a hydrogen atmosphere, and at about 500° C. to about 800° C. for about 1 hour to about 24 hours.

A mixing process of uniformly mixing the reaction materials used in the solid-state reaction method may also be performed so that each of the reaction materials can react with one another uniformly.

The oxide represented by Formula 1 has improved electrical characteristics and, thus, is suitable for a cathode active material used in a cathode. A cathode according to an embodiment is prepared by forming a cathode active material composition including a conductive agent, a binder, and a cathode active material prepared according to Formula 1 on a surface of a collector.

In the cathode active material composition, the conductive agent may be carbon black, and the binder may be a vinylidene fluoride/hexafluoropropylene copolymer, polyvinylidenefluoride, polyacrylonitrile, polymethylmethacrylate, polytetrafluoroethylene, mixtures thereof, or a styrene butadiene rubber-based polymer.

In this regard, the amounts of the cathode active material, the conductive agent, and the binder may be the same as in conventional lithium batteries.

The collector on which the cathode active material composition is formed may be any collector that is used in a cathode of a lithium battery in the art. For example, the collector may be an Al collector. The size and thickness of the collector may be the same as in conventional lithium batteries.

A method of preparing a cathode according to the embodiment will now be described in detail. First, a slurry including a binder, a conductive agent, a cathode active material prepared according to Formula 1, and an organic solvent is uniformly coated on a collector, and then dried to completely remove the organic solvent. As a result, a cathode active material composition layer is formed on the collector.

The binder and the conductive agent, which forms the slurry together with the cathode active material, the binder, and the conductive agent, may be the same as described above. The organic solvent may be a chain carbonate, such as dimethyl carbonate, ethyl methyl carbonate, diethyl carbonate, or dipropyl carbonate; a cyclic carbonate, such as dimethoxyethane, diethoxyethane, ester derivatives of fatty acids, ethylene carbonate, propylene carbonate, or butylene carbonate; gamma-butyrolactone; N-methylpyrrolidone; acetone; water; or combinations thereof.

A lithium battery including the cathode according to the embodiment will now be described in detail. Like the method of preparing a cathode, an anode active material, a conductive agent, a binder, and a solvent are mixed to prepare anode active material slurry, and then, the obtained anode active material slurry may be directly coated on a Cu collector to obtain an anode. Alternatively, the obtained anode active material slurry may be cast on a separate support, and then a resultant anode active material film exfoliated from the separate support may be laminated on a Cu collector to obtain an anode. In this regard, the amounts of the anode active material, the conductive agent, the binder, and the solvent may be the same as in conventional lithium batteries.

The anode active material may be a lithium metal, a lithium alloy, silicon, a silicon-based carbon composite, tin, a silicon-based oxide (for example, $SiO_x$, where $0<x<2$), a silicon oxide-carbon composite, a tin-based carbon composite, a silicon-tin-based composite, a silicon-tin-based carbon composite, a transition metal oxide, a carbonaceous material, or graphite. The conductive agent, the binder, and the solvent which form an anode active material composition may be the same as in the cathode. In some cases, the cathode active material composition and the anode active material composition may further include a plasticizer to form pores in an electrode plate.

The cathode and the anode may be separated by a separator that can be any separator that is commonly used in a lithium battery. Specifically, the separator may have a low resistance to ion mobility and excellent electrolytic solution retaining properties. Examples of the separator include glass fiber, polyester, TEFLON®, polyethylene, polypropylene, polytetrafluoroethylene (PTFE), and combinations thereof, each of which can be a nonwoven fabric or a woven fabric. For example, a lithium ion battery uses a foldable separator formed of polyethylene or polypropylene, and a lithium ion polymer battery uses a separator having excellent organic electrolytic solution retaining properties. A method of preparing these separators will now be described in detail.

A polymer resin, a filler, and a solvent are mixed to prepare a separator composition. Then, the separator composition may be directly coated on an electrode and then dried to form a separator film. Alternatively, the separator composition may be cast on a support, dried to form a separator composition film, and then, the separator composition film is separated from the support. Then, the separated film is laminated on an electrode to form a separator film.

The polymer resin is not limited and can be any material that is used as a binder of an electrode plate. For example, the polymer resin can be a vinylidene fluoride/hexafluoropropylene copolymer; polyvinylidenefluoride, polyacrylonitrile, polymethylmethacrylate, or mixtures thereof; or the like. For example, the polymer resin may be a vinylidene fluoride/hexafluoropropylene copolymer in which the amount of the hexafluoropropylene is in a range of about 8 to about 25 wt %.

The separator is disposed between the cathode and the anode to form a battery assembly. The battery assembly is wound or folded such that it can be placed in a cylindrical battery case or a rectangular battery case, and then an organic electrolytic solution is injected therein. As a result, a lithium ion battery is completed.

Meanwhile, a plurality of battery assemblies can be stacked in a bi-cell structure, and then dipped in an organic electrolytic solution. The obtained structure may be placed in a pouch and sealed to manufacture a lithium ion polymer battery.

An organic electrolyte may include lithium salt, and an organic solvent mixture of a solvent having a high dielectric constant and a solvent having a low boiling point.

The solvent having a high dielectric constant may be any solvent that is used in the art. For example, the solvent may be a cyclic carbonate, such as ethylene carbonate, propylene carbonate, or butylene carbonate; or gamma-butyrolactone.

The solvent having a low boiling point may be any solvent that is used in the art. For example, the solvent having a low boiling point may be a chain carbonate, such as dimethyl carbonate, ethyl methyl carbonate, diethyl carbonate, or dipropyl carbonate; or ester derivatives of fatty acids.

The mixture ratio of the solvent having a high dielectric constant to the solvent having a low boiling point may be in a range of about 1:1 to about 1:9. When the mixture ratio is outside this range, discharge capacity and charge and discharge lifetimes may be reduced.

The lithium salt may be any lithium salt that is used in conventional lithium batteries. For example, the lithium salt may include one or more compounds selected from the group consisting of $LiClO_4$, $LiCF_3SO_3$, $LiPF_6$, $LiN(CF_3SO_2)$, $LiBF_4$, $LiC(CF_3SO_2)_3$, and $LiN(C_2F_5SO_2)_2$, and mixtures thereof.

In the organic electrolyte, the concentration of the lithium salt may be in a range of about 0.5 to about 2M. When the concentration of the lithium salt is less than 0.5M, the conductivity of the organic electrolyte may be decreased. On the other hand, when the concentration of the lithium salt is greater than 2.0M, the viscosity of the organic electrolyte may be increased and the mobility of lithium ions may be decreased.

Figure 1:
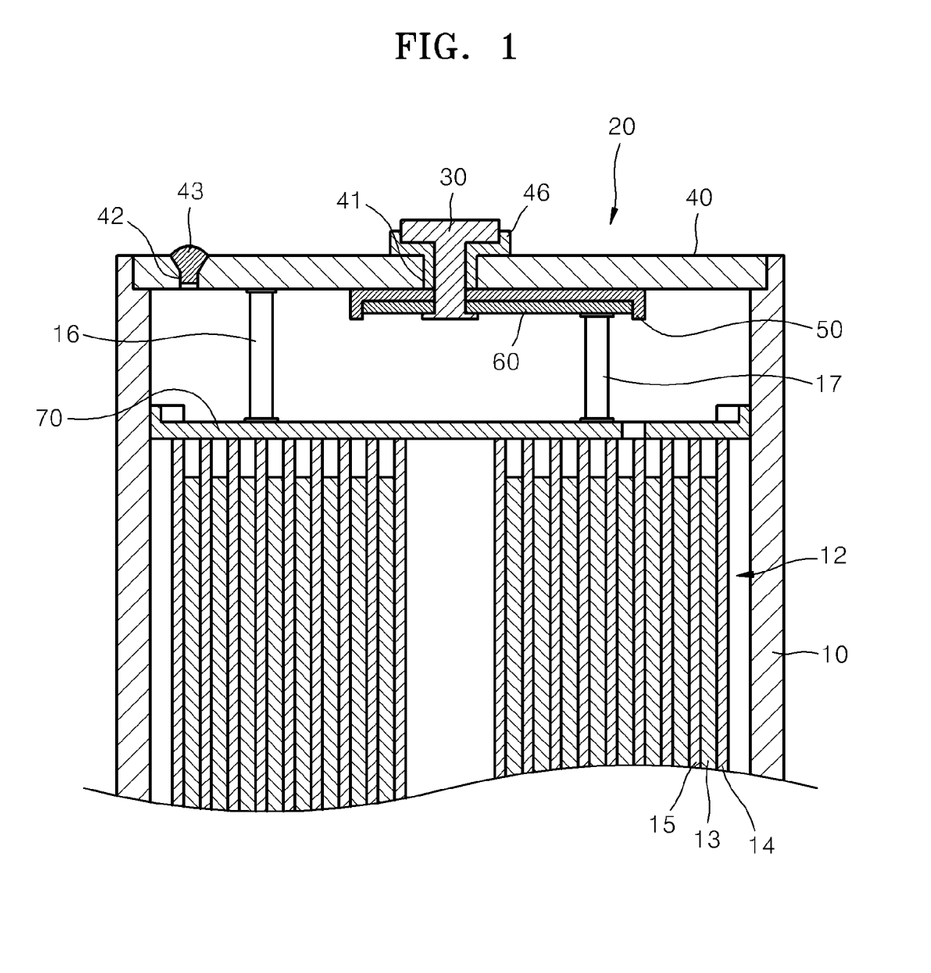
FIG. 1 is a schematic view of a structure of a lithium battery according to an embodiment.

An example of a lithium battery having the above structure is illustrated in FIG. 1. Referring to FIG. 1, in the lithium battery, an electrode assembly 12, including an anode 14, a cathode 15, and a separator 13 disposed between the anode 14 and the cathode 15, is disposed in a can 10 with an electrolyte solution, and an upper end of the can 10 is closed or sealed with a cap assembly 20. The cap assembly 20 includes a cap plate 40, an insulation plate 50, a terminal plate 60, and an electrode terminal 30. The cap assembly 20 is coupled to an insulation case 70 to close or seal the can 10.

The electrode terminal 30 is inserted into a terminal through-hole 41 that is formed in a center portion of the cap plate 40. When the electrode terminal 30 is inserted into the terminal through-hole 41, a gasket 46 is disposed at an outer surface of the electrode terminal 30 and inserted together with the electrode terminal 30 to insulate the electrode terminal 30 from the cap plate 40. The gasket 46 may be tube-shaped and may have a shape complementary to the electrode terminal 30. When the cap assembly 20 is assembled on the upper end of the cap 10, the electrolyte solution is injected through an electrolyte solution injection hole 42, and then the electrolyte solution injection hole 42 is sealed with a cover or a plug 43. The electrode terminal 30 is connected via the terminal plate 60 to a cathode tab 17 of the cathode 15 or to an anode tab 16 of the anode 14 so as to be a cathode terminal or an anode terminal. The other of the cathode tab 17 and the anode tab 16 may be connected to the cap plate 40.

Hereinafter, the cathode 15 and the lithium battery will be described in further detail with reference to Examples 1 through 14 and Comparative Example 1.

Comparative Example 1

Powders of $Li_2CO_3$ and $MoO_3$ were mixed such that the molar ratio of Li and Mo was 1.05:1, and reacted at 600° C. for 5 hours to prepare $Li_2MoO_4$ having a white, uniform composition. Then carbon was added in the same molar ratio as Mo in accordance with the amount of the reactant product and uniformly mixed to conduct the reaction as represented by Reaction 1 below. Thus, a comparative target cathode active material was obtained. The reaction was processed at 700° C. for 10 hours under a $N_2$ atmosphere.

<Reaction 1>

Example 1

$Mg(NO_3).6H_2O$ was mixed with $Li_2MoO_4$, as prepared in Comparative Example 1, in a molar ratio of Mo:Mg of 0.95:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 2

$Zn(NO_3).6H_2O$ was mixed with $Li_2MoO_4$, as prepared in Comparative Example 1, in a molar ratio of Mo:Zn of 0.95:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 3

$Zn(NO_3).6H_2O$ was mixed with $Li_2MoO_4$, as prepared in Comparative Example 1, in a molar ratio of Mo:Zn of 0.93:0.07, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 4

$Zn(NO_3).6H_2O$ was mixed with $Li_2MoO_4$, as prepared in Comparative Example 1, in a molar ratio of Mo:Zn of 0.9:0.1, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 5

$Ga_2O_3$ was mixed with $Li_2MoO_4$, as prepared in Comparative Example 1, in a molar ratio of Mo:Ga of 0.95:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 6

$GeO_2$ was mixed with $Li_2MoO_4$, as prepared in Comparative Example 1, in a molar ratio of Mo:Ge of 0.95:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 7

$Al(NO_3)_3.9H_2O$ and $Zn(NO_3)_2.6H_2O$ were mixed with $Li_2MoO_4$, as prepared in Comparative Example 1, in a molar ratio of Mo:Al:Zn of 0.94:0.03:0.03, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 8

$Mg(NO_3)_2.6H_2O$ and $Zn(NO_3)_2.6H_2O$ were mixed with $Li_2MoO_4$, as prepared in Comparative Example 1, in a molar ratio of Mo:Mg:Zn of 0.94:0.03:0.03, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 9

$Al(NO_3)_3.9H_2O$ and $Zn(NO_3)_2.6H_2O$ were mixed with $Li_2MoO_4$, as prepared in Comparative Example 1, in a molar ratio of Mo:Al:Zn of 0.92:0.03:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 10

$Al(NO_3)_3.9H_2O$ and $Zn(NO_3)_2.6H_2O$ were mixed with $Li_2MoO_4$, as prepared in Comparative Example 1, in a molar ratio of Mo:Al:Zn of 0.9:0.03:0.07, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Example 11

$Al(NO_3)_3.9H_2O$ and $Zn(NO_3)_2.6H_2O$ were mixed with $Li_2MoO_4$, as prepared in Comparative Example 1, in a molar ratio of Mo:Al:Zn of 0.9:0.05:0.05, and carbon was added thereto in the same molar ratio as Mo, and mixed uniformly. Then the mixture was subjected to a solid-state reduction reaction under a nitrogen atmosphere at 700° C. for 10 hours to obtain a target cathode active material.

Experimental Example 1

Figure 2:
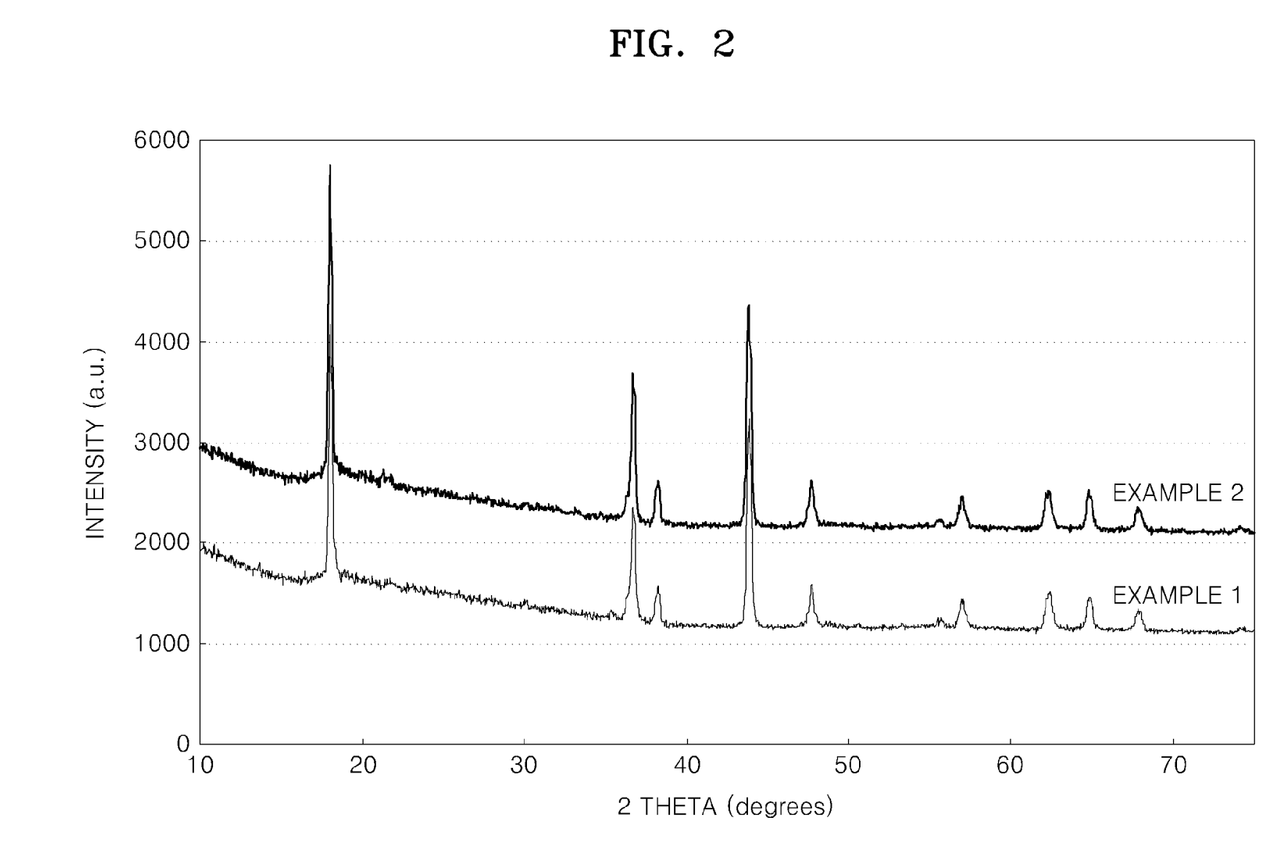
FIG. 2 is an x-ray diffraction (XRD) graph of a cathode active material prepared according to Examples 1 and 2.

X-ray diffraction (XRD) of the cathode active material powders obtained in Examples 1 and 2 was measured. The results are shown in FIG. 2. Referring to FIG. 2, all of the cathode active material powders show a single layer structure. When a heterogeneous element is doped to about 5 mol % with respect to molybdenum, a second phase, which deviates from the solid solubility limit, is not formed.

Figure 3:
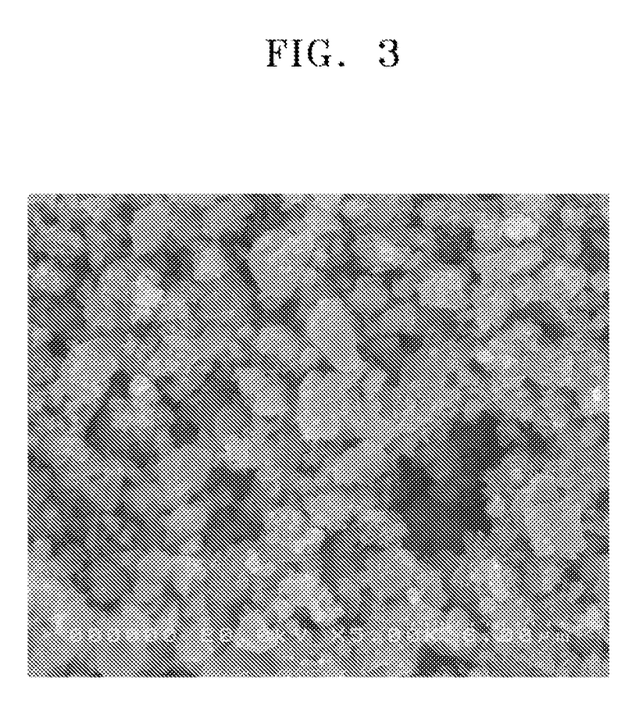
FIG. 3 is a scanning electron microscope (SEM) image of a cathode active material according to Comparative Example 1.

FIG. 3 is a scanning electron microscope (SEM) image of the cathode active material powder obtained in Comparative Example 1. As shown in FIG. 3, the cathode active material has a mean particle diameter of about 1 μm to about 2 μm, and the remaining carbon exists between particles.

Experimental Example 2

Electrochemical evaluation of the cathode active material obtained in Comparative Example 1 and Examples 1 and 2 was conducted. For the electrochemical evaluation, an electrode in which a slurry with a weight ratio of the cathode active material:carbon conducting agent:PVDF binder of 93:2:5 was coated on an Al foil was used, and then a coin type half cell (2016 size) having a lithium counter electrode was assembled. The half cell was charged and discharged at a constant current of 0.1 C in a voltage range of 1.5 to 4.5 V vs. Li.

Figure 4:
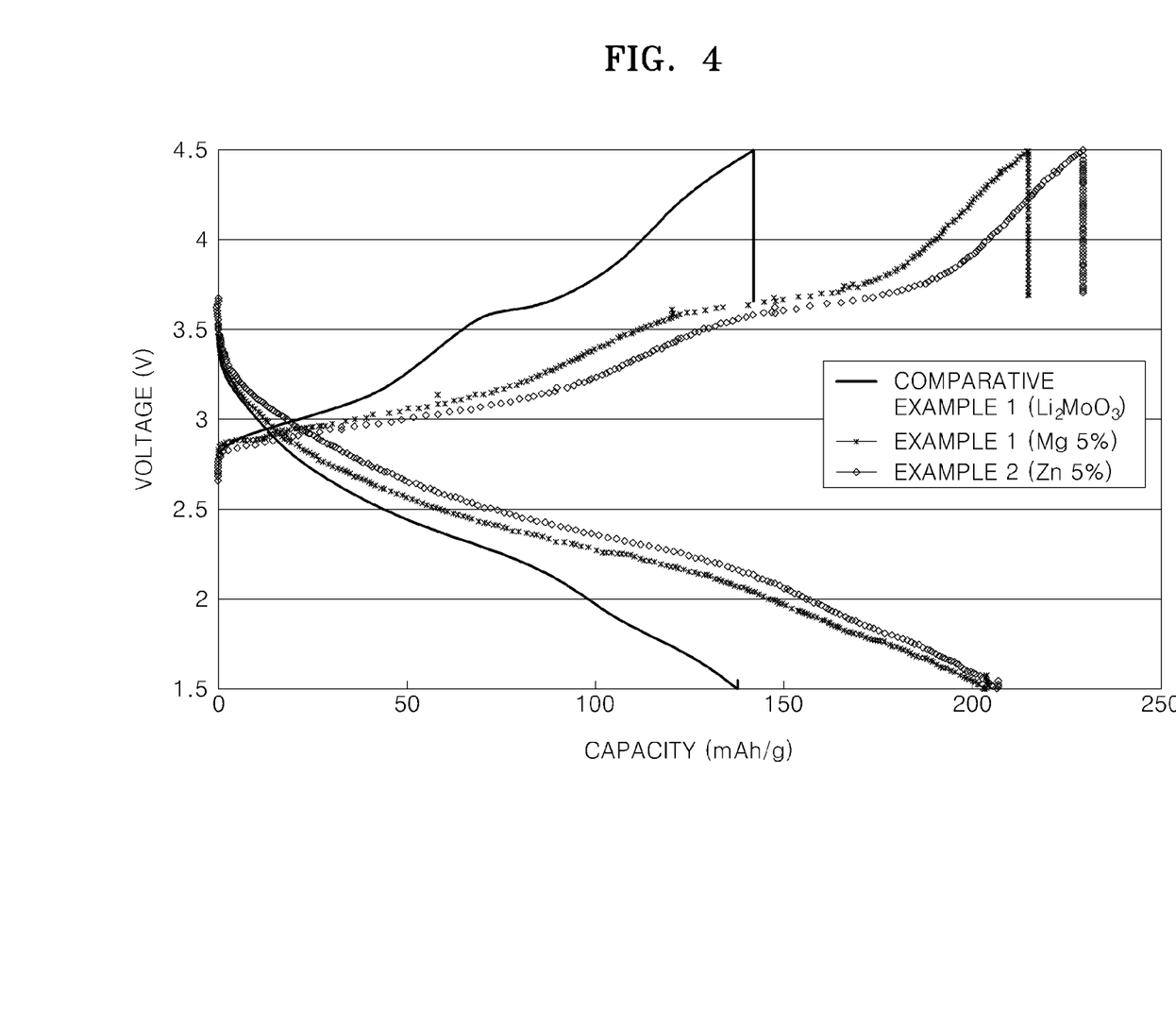
FIG. 4 illustrates initial charging/discharging curves in a section of 1.5 V to 4.5 V of lithium batteries including cathode active materials according to Comparative Example 1 and Examples 1 and 2.

FIG. 4 illustrates initial charge/discharge curves of the cathode active material obtained in Comparative Example 1 and Examples 1 and 2. Referring to FIG. 4, the cathode active material powders of Examples 1 and 2 show far higher capacities than that of the cathode active material powder of Comparative Example 1. In detail, referring to the form of the charge curves illustrated in FIG. 4, there are two smooth voltage regions with reference to 3.5 V, and the capacities of the two regions are increased after doping. Accordingly, it can be concluded that the doping process greatly improved the charge/discharge capacities of Examples 1 and 2 compared to Comparative Example 1.

Experimental Example 3

The initial charge capacities of the cathode active materials obtained in Comparative Example 1 and Examples 1 through 11 were measured, and the results are shown in Table 1 below.

The initial charge capacities were measured by using an electrode in which a slurry with a weight ratio of the cathode active material:carbon conducting agent:PVDF binder of 93:2:5 was coated on an Al foil, and then assembling a half cell (2016 size) having a lithium counter electrode. The half cell was charged and discharged at a constant current of 0.1 C in a voltage range of 1.5 to 4.5 V vs. Li.

TABLE 1

| | Initial charge capacity (mAh/g) |
| --- | --- |
| Comparative Example 1 | 142 |
| Example 1 | 215 |
| Example 2 | 229 |
| Example 3 | 237 |
| Example 4 | 226 |

TABLE 1-continued

| | Initial charge capacity (mAh/g) |
|---|---|
| Example 5 | 151 |
| Example 6 | 147 |
| Example 7 | 241 |
| Example 8 | 198 |
| Example 9 | 249 |
| Example 10 | 235 |
| Example 11 | 227 |

As shown in Table 1, Examples 1 through 11, which used a doping element in accordance with aspects of the invention, exhibited higher initial charge capacities than Comparative Example 1, which did not use a doping element. In particular, Examples 7 through 11, which used two doping elements in accordance with aspects of the invention, exhibited far more excellent initial charge capacities. For example, Example 9 exhibited an initial charge capacity of about 249 mAh/g, which was about 78% of a theoretical capacity of about 320 mAh/g.

As described above, according to the one or more of the above embodiments, the cathode active materials obtained by doping various heterogeneous elements to $Li_2MoO_3$ show improved electrical characteristics and can be used in various secondary batteries, such as lithium batteries.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode comprising a cathode active material composition including a conducting agent, a binder, and a cathode active material, the cathode active material being disposed on a surface of a current collector, wherein the cathode active material comprises a compound represented by Formula 1 below:

$$Li_xM_yMo_zO_3 \quad \text{<Formula 1>}$$

wherein 0.1≤x≤2.3, 0≤y≤0.3, 0.7≤z≤1.1, and
wherein M is selected from the group consisting of Ga, Ge, Mg, Zn, Cd, K, Ca, Si, Cu, Sn, B, P, Se, Bi, As, Zr, Cr, Sr, Sc, Y, Ba, a rare-earth element, a combination of Al and Zn, a combination of Zn and Mg, and mixtures thereof.

2. The cathode as claimed in claim 1, wherein M in Formula 1 comprises at least one selected from the group consisting of Ga, Ge, Mg, and Zn.

3. The cathode as claimed in claim 1, wherein M in Formula 1 comprises the combination of Zn and Mg.

4. The cathode as claimed in claim 1, wherein M in Formula 1 comprises the combination of Al and Zn.

5. The cathode as claimed in claim 1, wherein the cathode active material has a single layer structure.

6. The cathode as claimed in claim 1, wherein the cathode active material further includes carbon in addition to the compound represented by Formula 1.

7. The cathode as claimed in claim 6, wherein the carbon is present in an amount of about 0.1 wt % to about 5 wt % with respect to the total weight of the compound represented by Formula 1.

8. The cathode as claimed in claim 1, wherein the compound represented by Formula 1 is prepared by mixing $Li_2MoO_4$ with a source of M in the presence of carbon to form a mixed product, and heat-treating the mixed product under a reduction atmosphere at about 500° C. to about 800° C. for about 1 hour to about 24 hours.

9. A lithium battery comprising:
the cathode according to claim 1;
an anode;
a separator disposed between the anode and the cathode; and
an organic electrolyte solution disposed in the lithium battery.

10. A cathode active material for a battery, the cathode active material comprising a compound represented by Formula 1 below:

$$Li_xM_yMo_zO_3 \quad \text{<Formula 1>}$$

wherein 0.1≤x≤2.3, 0≤y≤0.3, 0.7≤z≤1.1, and
wherein M is selected from the group consisting of Ga, Ge, Mg, Zn, Cd, K, Ca, Si, Cu, Sn, B, P, Se, Bi, As, Zr, Cr, Sr, Sc, Y, Ba, a rare-earth element, a combination of Al and Zn, a combination of Zn and Mg, and mixtures thereof.

11. A cathode active material for a battery, the cathode active material comprising a compound represented by Formula 1 below:

$$Li_xM_yMo_zO_3 \quad \text{<Formula 1>}$$

wherein 0.1≤x≤2.3, 0≤y≤0.3, 0.7≤z≤1.1, and
wherein M is a dopant that decreases mobility of the Mo during charging and/or discharging of the battery, and M is selected from the group consisting of Ga, Ge, Mg, Zn, Cd, K, Ca, Si, Cu, Sn, B, P, Se, Bi, As, Zr, Cr, Sr, Sc, Y, Ba, a rare-earth element, a combination of Al and Zn, a combination of Zn and Mg, and mixtures thereof.

12. A method of preparing a cathode active material for a battery, the method comprising:
mixing $Li_2MoO_4$ with a dopant M in the presence of carbon to form a mixture, wherein M is selected from the group consisting of Ga, Ge, Mg, Zn, Cd, K, Ca, Si, Cu, Sn, B, P, Se, Bi, As, Zr, Cr, Sr, Sc, Y, Ba, a rare-earth element, a combination of Al and Zn, a combination of Zn and Mg, and mixtures thereof; and
heat treating the mixture to form $Li_xM_yMo_zO_3$, wherein 0.1≤x≤2.3, 0≤y≤0.3, and 0.7≤z≤1.1.

13. The method as claimed in claim 12, wherein the carbon is present in an amount of about 1.0 mol per mol of the $Li_2MoO_4$.

14. The method as claimed in claim 12, wherein an amount of the dopant M is about 0.3 mol or less with respect to about 0.7 mol to about 1.1 mol of molybdenum.

15. The method as claimed in claim 12, wherein the heat treating of the mixture is under a reduction atmosphere.

16. The method as claimed in claim 12, wherein the heat treating of the mixture is performed at about 500° C. to about 800° C.

17. The method as claimed in claim 12, wherein the heat treating of the mixture is performed for about 1 hour to about 24 hours.

18. The method as claimed in claim 12, wherein the $Li_2MoO_4$ is prepared a solid-state reaction method, a sol-gel method, a calcination method, or a co-precipitation method.

* * * * *